United States Patent [19]

Peile

[11] Patent Number: 4,821,288
[45] Date of Patent: Apr. 11, 1989

[54] PARALLEL CHANNEL EQUALIZER ARCHITECTURE

[75] Inventor: Robert E. Peile, Pasadena, Calif.

[73] Assignee: Cyclotomics, Inc., Berkeley, Calif.

[21] Appl. No.: 135,796

[22] Filed: Dec. 21, 1987

[51] Int. Cl.⁴ ............................................ H03K 5/159
[52] U.S. Cl. .......................................... 375/11; 371/2; 333/18
[58] Field of Search ......................... 375/11, 12, 13, 14; 371/2, 37, 38, 40; 333/18, 28 R; 364/724

[56] References Cited

U.S. PATENT DOCUMENTS

| 3,750,145 | 7/1973 | Klein | 375/11 |
| 4,293,952 | 10/1981 | Tamori et al. | 375/14 |
| 4,468,786 | 8/1984 | Davis | 333/18 |
| 4,555,788 | 11/1985 | Merrill | 375/11 |
| 4,559,625 | 12/1985 | Berlekamp et al. | 371/2 |
| 4,575,857 | 3/1986 | Murakami | 375/12 |

Primary Examiner—Robert L. Griffin
Assistant Examiner—Stephen Chin
Attorney, Agent, or Firm—Robert M. Wallace

[57] ABSTRACT

Plural n-symbol codewords are helically interleaved and transmitted in a stream. A receiver views the transmitted stream through n time windows, each time window having a length accommodating the longest anticipated decorrelation time of the channel. Individual equalizers process the data in individual windows. The n windows simultaneously furnish the n symbols of each codeword to an error correction decoder. The n equalizers respond to feedback in which the output of the decoder is substituted in place of undecoded symbols from the n windows whenever available.

12 Claims, 11 Drawing Sheets

DATA PLUS SYNC STREAM:

01,02,03,04,05,06,07,S — CODEWORD "A"
09,10,11,12,13,14,15,S — CODEWORD "B"
17,18,19,20,21,22,23,S
25,26,27,28,29,30,31,S
33,34,35,36,37,38,39,S
41,42,43,44,45,46,47,S
49,50,51,52,53,54,55,S
57,58,59,60,61,62,63,S
65,66,67,68,69,70,71,S
73,74,75,76,77,78,79,S
81,82,83,84,85,86,87,S
89,90,91,92,93,94,95,S
XX,XX,XX,XX,XX,XX,XX,S
XX,XX,XX,XX,XX,XX,XX,S

FIG. 2(a) PRIOR ART

INTERLEAVING ARRAY:

01, — CODEWORD "A"
02,09, — CODEWORD "B"
03,10,17
04,11,18,25,
05,12,19,26,33,
06,13,20,27,34,41,
07,14,21,28,35,42,49,
S,15,22,29,36,43,50,
57,S,23,30,37,44,51, — CODEWORD "C"
58,65,S,31,38,45,52,
59,66,73,S,39,46,53,
60,67,74,81,S,47,54,
61,68,75,82,89,S,55,
62,69,76,83,90,XX,S,
63,70,77,84,91,XX,XX, — Z
S,71,78,85,92,XX,XX,
S,79,86,93,XX,XX,
S,87,94,XX,XX,
S,95,XX,XX,
CODEWORD "D"   S,XX,XX,
S,XX,
S,

TRANSMITTED STREAM (PARTIAL):

07,14,21,28,35,42,49,S,15,22,29,36,43,50,57,S,23,30,37,44,51,
58,65,S,31,38,45,52,59,66,73,S,39,46,53,60,67,74,81,S,47,54,
61,68,75,82,89,S,55,62,69,76,83,90,XX,S,63,70,77,84,91,XX,XX,

| | | DFR 0 | | | | | | | | |
|---|---|---|---|---|---|---|---|---|---|---|
| SYMBOL 0 | 49 | 42 | 35 | 28 | 21 | 14 | 07 | S | 41 | 34 ..... |

| | | DFR 1 | | | | | | | | |
|---|---|---|---|---|---|---|---|---|---|---|
| SYMBOL 1 | 50 | 43 | 36 | 29 | 22 | 15 | S | 49 | 42 | 35 ..... |

| | | DFR 2 | | | | | | | | |
|---|---|---|---|---|---|---|---|---|---|---|
| SYMBOL 2 | 51 | 44 | 37 | 30 | 23 | S | 57 | 50 | 43 | 36 ..... |

| | | DFR 3 | | | | | | | | |
|---|---|---|---|---|---|---|---|---|---|---|
| SYMBOL 3 | 52 | 45 | 38 | 31 | S | 65 | 58 | 5 | 44 | 37 ..... |

| | | DFR 4 | | | | | | | | |
|---|---|---|---|---|---|---|---|---|---|---|
| SYMBOL 4 | 53 | 46 | 39 | S | 73 | 66 | 59 | 52 | 45 | 38 ..... |

| | | DFR 5 | | | | | | | | |
|---|---|---|---|---|---|---|---|---|---|---|
| SYMBOL 5 | 54 | 47 | S | 81 | 74 | 67 | 60 | 53 | 46 | 39 ..... |

| | | DFR 6 | | | | | | | | |
|---|---|---|---|---|---|---|---|---|---|---|
| SYMBOL 6 | 55 | S | 89 | 82 | 75 | 68 | 61 | 54 | 47 | 40 ..... |

PARALLEL CHANNEL EQUALIZER ARCHITECTURE

RELATED APPLICATIONS

This application contains subject matter related to U.S. patent application Ser. No. 135,807 filed Dec. 21, 1987 by Robert E. Peile and entitled "Multiple Parallel Channel Equalization Architecture" and to U.S. patent application Ser. No. 141,241 filed Jan. 6, 1988 by Robert E. Peile and Earl T. Cohen and entitled "Probabilistic Fade Forecasting."

BACKGROUND OF THE INVENTION

The general problem of digital signaling over fading multi-path channels is described by Proakis, *Digital Communications*, McGraw-Hill, Inc., 1983 in Chapter 7. In a very elementary sense, the multi-path channel is a model for describing why some communication channels fade in and out, various causes being possible, and not pertinent to the present discussion. When using error correction decoding, the problem is what to do when the channel is known to fade in and out sporadically.

One well-known solution is to use equalization, in which feedforward and feedback data provides a predictive correction to each sample of the received signal. In this technique, some of the data already received has been demodulated, providing a highly reliable estimate of the received signal, while the remaining portion has not yet been demodulated and is therefore not as reliable. The received data is viewed through a time window in which the current signal sample sits in the temporal middle, some of the previous data having been corrected, and is therefore available as "decision feedback" data. Each sample in the time window is multiplied by some equalizer coefficient. The received sample value is compared with the predictive correction to the received sample generated by the equalizer when it later becomes available, the difference then being employed to provide a better estimate for the value of each of the equalizer coefficients. Probably the best known example of such an algorithm is the Kalman algorithm described in the above referenced text by Proakis beginning at page 421.

The approach taken in the present invention is to combine error correction encoding/decoding with equalization. However, a straight-forward combination of the equalizer and an error correction decoder suffers from the disadvantage that the output of the error correction decoder (which is the most reliable feedback) is delayed by at least one codeword time, so that the comparison of the predictive correction generated by the equalizer with the corresponding decoded symbol generated by the decoder is not available until long after the equalizer has processed the corresponding signal sample. This either postpones the updating of the equalizer coefficients by the Kalman algorithm and therefore impedes overall performance, or necessitates using less reliable data that has not yet been decoded as feedback.

One technique for dealing with a fading channel is a subject of U.S. Pat. No. 4,559,625 by Elwyn R. Berlekamp and Po Tong, entitled "Interleavers for Digital Communications". In this technique, plural codewords are helically interleaved together to form a single stream of data. The receiver has a de-interleaving array corresponding to the interleaving array of the transmitter. The de-interleaving provides decoded versions of those symbols transmitted immediately prior to the currently received sample. In the presence of long error bursts, typical of fading channels, the current received signal is easily predicted as an erasure before it enters the decoder, since it will have been preceded immediately by a series of symbols which are known to have been decoded as erasures. Thus, the location of the current symbol is provided to the decoder as an erasure location before the decoder begins decoding the codeword including the current symbol, thus saving decoding time and increasing the decoder's apparent error correction capacity.

A variation on the aforementioned technique of U.S. Pat. No. 4,559,625 is the use of an equalizer (using the Kalman algorithm) in combination with the helical interleaving of the codewords. This variation employs previously decoded symbols as feedback data, and the Kalman algorithm is provided with a known constant value for $\tau_0$, the channel decorrelation time. This variation was simulated in a demonstration pursuant to a contract with a customer by Cyclotomics, Inc. in 1984.

PROBLEM TO BE SOLVED

One problem that still remains is how to attack the fading channel problem when the decorrelation time $\tau$ is unknown and/or time varying in an unknown manner. Another problem is how to more fully exploit the characteristics of helically interleaved encoding and decoding to obtain superior performance in comparison with the known techniques discussed above.

SUMMARY OF THE INVENTION

The invention is an array of equalizers operating in parallel upon received data comprising helically de-interleaved codewords of length n. Each of the n equalizers views the interleaved codeword stream through n individually offset time windows. Each time window includes (among other symbols) a corresponding one of the n symbols of the codeword which is about to be decoded in a decoder. The feedforward portion of each time window includes signal samples antecedent to the current signal sample which have not yet been decoded. The feedback portion of each time window comprises signal samples preceding the current sample which have already been decoded. The current signal sample may be thought of as residing in the temporal "middle" of the corresponding time window during a certain instant in time. In the preferred embodiment of the invention, the feedback portion of each time window is restricted to include only those symbols immediately preceding the current sample in the time window which have been already decoded.

Each equalizer includes a multiplier coefficient for each signal sample or decoded symbol included in its time window. The sum of the products of the individual signal samples and decoded symbols included in each time window with the corresponding coefficients produces a predictive correction to the current received signal sample. The samples so corrected in each of the n equalizers are furnished to an error correction decoder as a single codeword to be decoded. The decoded codeword symbols produced by the decoder are compared, symbol by symbol, with each of the corresponding corrected signal samples previously produced by each of the corresponding equalizers. An individual tap update processor associated with an individual equalizer uses that comparison involving the corresponding one of the decoded symbols to update the multiplier coefficients of the corresponding equalizer. This updating process employs a least squares algorithm or a Kalman algorithm or the like. Thus, the multiplication coefficients of each equalizer are either continually refined or corrected for any time variation in channel characteristics.

SOLUTION TO THE PROBLEM

The foregoing architecture solves the problem of more fully exploiting the characteristics of helically interleaved codeword arrays by providing n separate equalizers which view the incoming helically interleaved data stream through n separate time windows of a given duration (which may be thought of as n parallel channels). Thus, equalization of one time segment is independent of equalization of another time segment during a given codeword time. Each time window or segment is treated in effect as a separate one of a plurality of parallel channels, notwithstanding the data was transmitted on a single channel. Moreover, no prior knowledge of channel characteristics is required nor is an assumption of constant channel characteristics required for the invention to operate. Instead, the equalizer coefficients (taps) are updated with no prior assumptions, by comparing the equalizer performance with the decoded results to obtain a better estimate of the equalizer coefficients for each of the n time windows or parallel channels.

DESCRIPTION OF THE DRAWINGS

The invention may be understood by reference to the accompanying drawings of which:

FIG. I is a simplified schematic of a conventional equalizer with a feedforward register and a decision feedback register;

FIGS. 2a, 2b and 2c illustrate the helical interleaving process which is the subject of the issued patent referenced above herein;

FIG. 4b illustrates the temporal arrangement of the n time windows in the architecture of FIG. 4a;

FIG. 5 is a diagram illustrating the availability of decoded symbols to each of the decision feedback registers in FIG. 4a;

FIG. 8 illustrates the shifting and cycling operations in the array of feedforward registers in the architecture of FIG. 4a; and FIGS. 9, 10(a–i) and 11 illustrate a working example, spanning two codeword times, of the operation of the parallel channel equalizer architecture of FIG. 4a.

DETAILED DESCRIPTION

Equalization and the Fading Channel

The problem of communicating over a sporadically fading channel is well-known and is described for example in the above-referenced text by Proakis. One solution to this sort of problem is to provide equalization, in which the channel characteristics are reciprocated in an equalizer such as that shown in FIGS. 6.4.1 in the Proakis text. The output of the equalizer is really a predictive correction to the current received signal sample based on other signal samples received at previous (or future) times. Each of the multiplier coefficients (by which each signal sample is multiplied) is updated in view of equalizer performance after each new sample.

Figure 1:
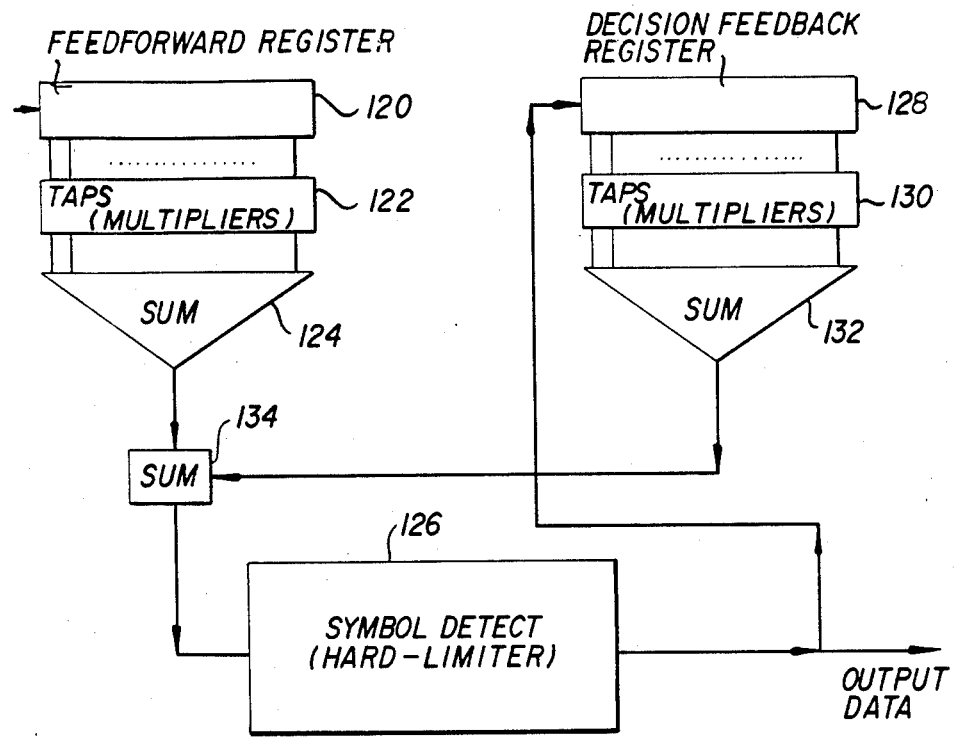

Referring to FIG. 1 herein, such a technique may be combined with error correction to provide a more reliable estimate of the performance of the equalizer and therefore a more reliable standard for updating the equalizer coefficients. In FIG. 1, the incoming signal samples are shifted successively into a feedforward shift register 120. The feedforward register 120 defines a portion of a time window of fixed temporal length in which a continuous stream of successive signal samples is viewed as it flows through the system. Ideally, the length of the time window reflects the longest anticipated impulse response time of the channel (which itself may vary in time). Each signal sample stored in the feedforward register 120 is multiplied by a corresponding coefficient stored in a tap register 122, the product being furnished to an adder 124, which combines all of the products to form a sum. This sum comprises a corrected version of the current incoming signal sample, which version is furnished to a detector 126. In the simplest case, detector 126 is simply an analog-to-digital converter which must make a decision whether each bit in a byte representing an incoming signal sample is a binary 0 or a binary 1. In more complex cases, the detector 126 is a demodulator. The decisions (demodulated signals) generated by the detector 126 are stored successively in a decision feedback register 128. The decision feedback register 128 defines the remaining portion of the time window through which the incoming signal samples are viewed. The contents of the decision feedback register 128 are individually multiplied by the coefficients stored in a tap register 130, the products being furnished to an adder 132 which forms a sum of all of them. An adder 134 combines the sums obtained from the feedforward adder 124 and the feedback adder 132 to provide the predictive correction to the incoming signal sample. The detector 126 may include an error correction decoder, so that as long as its error correction capacity is not exceeded, the demodulated symbols it furnishes to the decision feedback register 128 are highly reliable. In such a case, the feedforward register 120 contains the earlier undemodulated portion (signal samples) of the stream within the time window while the feedback register 128 contains the later demodulated/decoded portion (corrected symbols) of the stream within the time window.

The difference between the predicted value of the current incoming signal sample and the corresponding decoded symbol generated by the decoder 126 (after some delay) provides a measure of the performance of the equalizer. Various well-known algorithms may be employed to process this comparision in order to update or provide corrections to each of the multiplier coefficients stored in the tap registers 122, 130 in preparation for the next incoming signal sample. (In view of the foregoing discussion, it is understood the feedforward register 120 contains undemodulated (undecoded) signal samples, while the feedback register 128 contains demodulated (decoded) symbols. However, for the sake of simplicity, the contents of both the feedforward and feedback registers is referred to herein as "symbols".)

The problem with this ideal arrangement of error correction and equalization is that, for codewords of length n, the highly reliable demodulated (decoded) symbol corresponding to a given incoming signal sample is not available for on the average of at least n sample times (i.e., one codeword time), since the detector 126 requires all n samples of a given codeword to be present before decoding the codeword. In practice, this delay is typically many codeword times. This throughput delay severely detracts from the theoretical performance of such an equalizer.

(A more detailed discussion of the type of equalizer illustrated in FIG. 1 is provided in the Proakis text referenced above beginning at page 382.)

Codeword Interleaving

Figure 3:
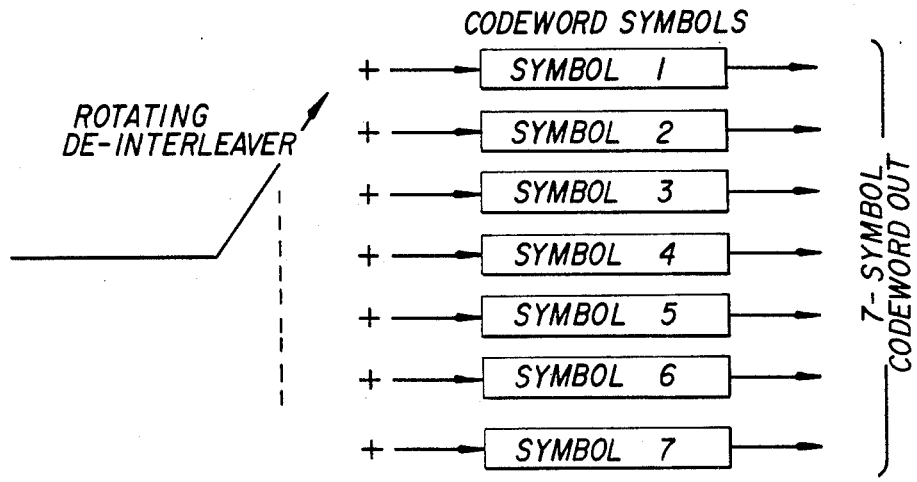
FIG. 3 is a simplified schematic diagram suggesting the operation of a hypothetical rotating helical de-interleaver in the process illustrated in FIGS. 2a, 2b and 2c.

FIGS. 2a, 2b and 2c illustrate the helical interleaving process of a plurality of codewords, which process is a subject of U.S. Pat. No. 4,559,625 by Elwyn R. Berlekamp and Po Tong referenced above. FIG. 2a illustrates the example of fourteen seven-symbol codewords (with a sync symbol S between adjacent codewords) arranged in a block array. FIG. 2b illustrates the helical interleaving of the fourteen codewords of FIG. 2a by arranging the codewords in vertically offset columns. The arrangement of FIG. 2b is called the interleaving array. The transmitted stream of codeword symbols illustrated in FIG. 2c is obtained by simply reading out row by row the codeword symbols from the interleaving array of FIG. 2b. FIG. 2c begins at symbol 7, which is in the seventh row of the interleaving array of FIG. 2b. Upon receiving the transmitted helically interleaved stream of FIG. 2c, a de-interleaver must be employed to reconstruct each of the transmitted codewords. Such a de-interleaver may be thought of as a rotating switch, as illustrated in FIG. 3. Basically, in order to de-interleave the transmitted stream of FIG. 2c, a de-interleaving array must somehow be constructed (employing for example the rotating de-interleaver of FIG. 3) to reconstruct the array illustrated in FIG. 2b. Thus, the arrangement of FIG. 2b will be referred to as an interleaving array in the case of a transmitter and as a de-interleaving array in the case of a receiver, the two terms being equivalent. As discussed in the referenced patent, the process of FIGS. 2a-2c has the advantage that at least one of the symbols immediately preceding the currently received symbol has been decoded or is a known synchronization symbol. In fact, in most cases more than one has been decoded, depending upon the position the symbol occupies in the codeword.

Parallel Channel Equalizer Architecture

In contrast with the prior art, rather than viewing the helically interleaved transmitted stream of symbols illustrated in FIG. 2c in a single time window, defined by the length of the feedforward register 120 and the decision feedback register 128 of FIG. 1, the present invention views the helically interleaved stream of FIG. 2c through separate time windows simultaneously, the number of time windows preferably corresponding to the number of symbols in each codeword. Moreover, the windows are arranged such that they all receive a respective one of the symbols in the same codeword simultaneously. (In other words, if one looked at only the last symbol to arrive in all of the time windows simultaneously, one would see all symbols of one codeword.)

Figure 4A:
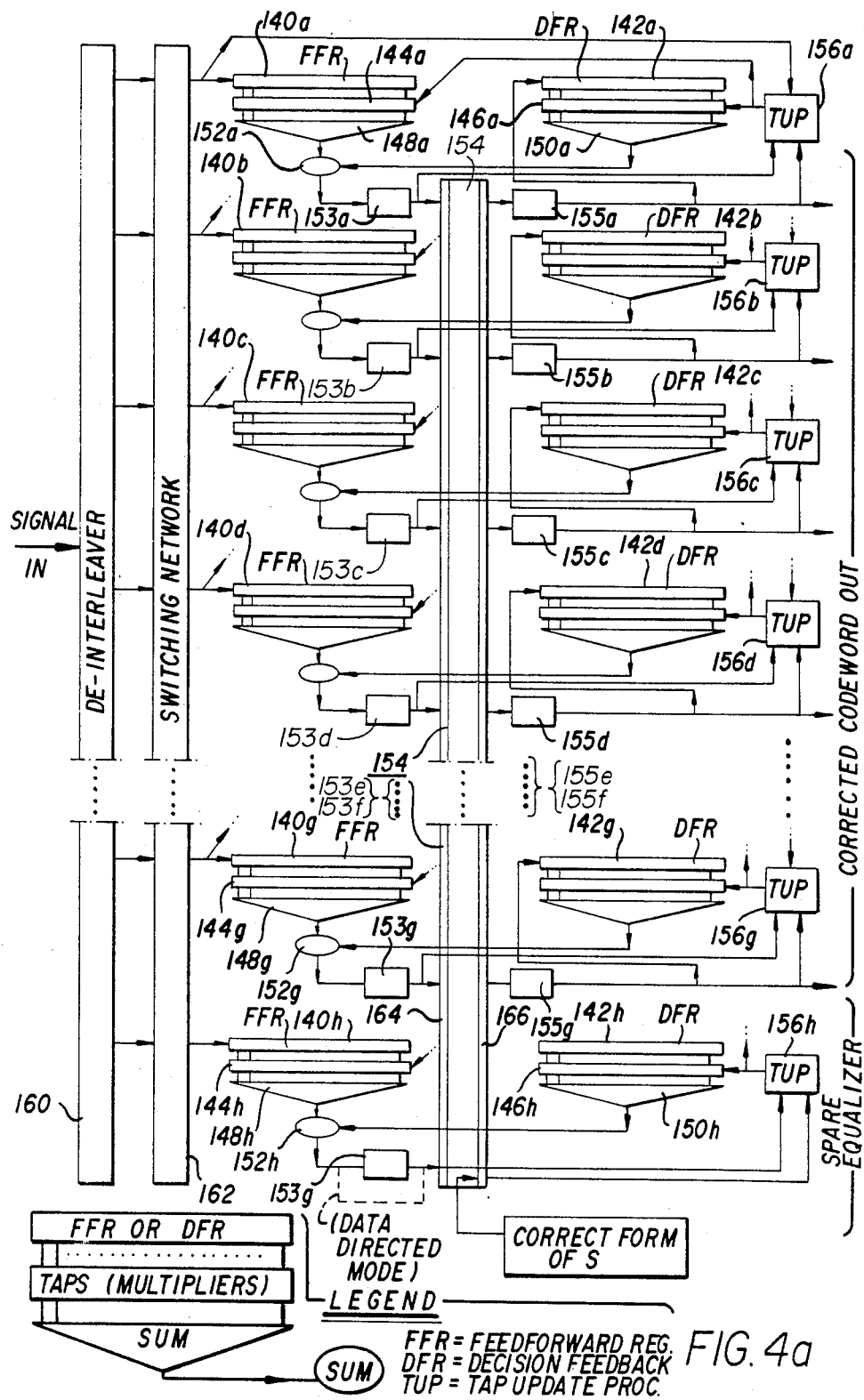
FIG. 4a is a diagram illustrating the parallel channel equalizer architecture of the invention.

A system embodying this concept is illustrated in FIG. 4a. In FIG. 4a, the length of each time window is defined by the length of a corresponding feedforward register 140 and decision feedback register 142. For codewords of length n, there are n feedforward registers 140 and n decision feedback registers 142, together defining the n time windows through which the transmitted stream of helically interleaved codeword symbols of FIG. 2c is viewed. The number of successive symbols stored in the feedforward register 140 and stored in the decision feedback register 142 preferably is determined by the greatest anticipated impulse response time of the channel.

Each of the feedforward registers 140 is associated with a tap register 144 containing the feedforward equalization multiplier coefficients for that particular time window. Each of the decision feedback registers 142 is associated with a tap register 146 containing the feedback equalization multiplier coefficients for that particular time window. Each of the feedforward registers 140 receives one of the rows of symbols (i.e., the signal samples received from the channel) from a de-interleaving array 160 (which is identical to the array illustrated in FIG. 2b). For codewords of length n, the n feedforward registers 140 receive the first n rows from the array of FIG. 2b symbol by symbol.

For each pair of feedforward and feedback registers, the products generated from multiplications of individual symbols by corresponding coefficients stored in the corresponding pair of tap registers 144 and 146 are added together in a corresponding pair of adders 148, 150 respectively. The sums from the two adders 148, 150 are combined in a corresponding final adder 152 whose output is the predictively corrected version of the current received signal sample (which is the last-to-arrive signal sample in the corresponding feedforward register 140). The n predictively corrected signal samples thus generated at the n adders 152 are furnished simultaneously through (if necessary) n detectors 153 to an error correction decoder 154. The n detectors 153 may, for example, each demodulate a QPSK signal sample to produce a demodulated two-bit byte symbol. The decoder 154 views the n demodulated symbols as a codeword block of length n and decodes it in accordance with a predetermined code. The decoder 154 thus generates a decoded codeword comprising n corrected codeword symbols.

The n corrected symbols are shifted into corresponding ones of the decision feedback registers 142 in preparation for reception of the next signal sample in the feedback registers 140. Thus, while the feedforward registers 140 contain only the actually received signal samples, the decision feedback registers 142 contain decoded versions of the signal samples as mentioned above.

Figure 4B:
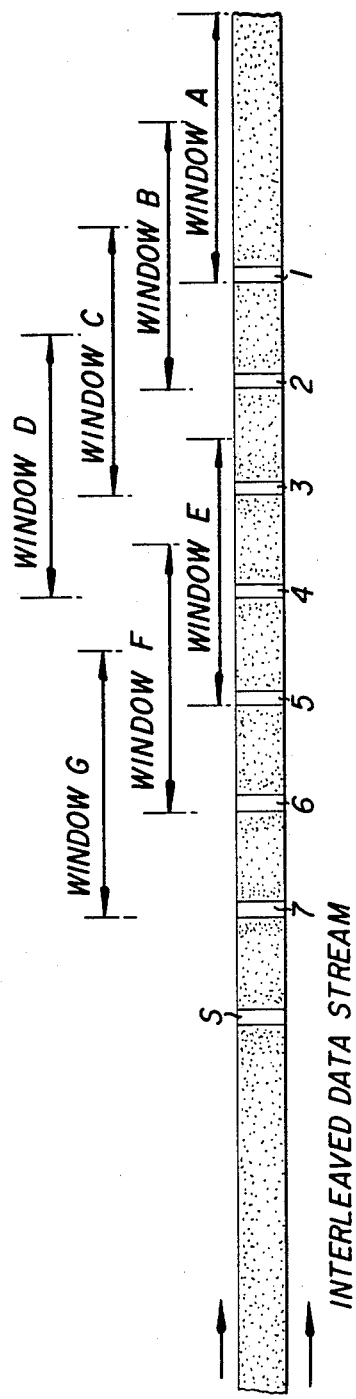

FIG. 4b illustrates an example in which the codeword length is seven symbols, not including a synchronization symbol, and in which there are seven corresponding time windows through which the interleaved data stream of FIG. 2c is viewed. The time windows A–G of FIG. 4b correspond to the feedforward and feedback registers 140a–g and 142a–g, respectively, of FIG. 4a. In FIG. 4b, the time windows A–G may be considered as being of fixed length and fixed position, and the interleaved data stream of FIG. 2c as travelling through the windows A–G. The number of windows equals n, the number of symbols per codeword. The windows partially overlap in time. Significantly, the last set of symbols received at any given time in the windows A-G together comprise the seven codeword symbols. At the same time, each of the windows A-G includes the symbols of other codewords.

ERROR CORRECTION DECODING

Each of the predictively corrected signal samples generated in the adders 152a-g is an analog signal sample, and (in one embodiment) is demodulated to a digital symbol in a corresponding one of the plurality of detectors 153a-g before being processed in the error correcting decoder 154. The error correcting decoder 154 receives the n symbols of a given transmitted codeword simultaneously once every n signal sample times (where n = codeword length). Referring to FIG. 4b, if the codeword length n is seven symbols, then the error correcting decoder 154 (disregarding the synchronization symbol S) receives the predictively corrected version of each of the seven symbols last shifted into each of the seven time windows A-G (e.g., codeword symbols 1-7) after a sync symbol S is detected. The decoder 154 may use any error correction decoding scheme currently known in the art. Preferably, however, the error correcting decoder 154 is a Reed-Solomon decoder. In this embodiment, at least two redundant symbols in the transmitted codeword were computed from the remaining symbols prior to transmission in accordance with a code generator polynomial known to the error correcting decoder 154. The decoder 154 provides, at its output, the correct version of the transmitted codeword, as long as the received codeword does not contain a number of erroneous symbols exceeding one-half the number of redundant symbols, in accordance with well-known error correction encoding/decoding techniques.

At this point, assuming the error correction capacity of the decoder 154 has not been exceeded, the performance of each of the equalizers (comprising the tap registers 144a-g and 146a-g) may be evaluated by comparing the predictively corrected version of each signal sample with the corresponding corrected codeword symbol generated at the output of the decoder 154. This comparison must wait for a period of time equal to the throughput delay of the decoder 154. Significantly, this is a vast improvement over the prior art, in which the delay time was at least equal to the time it took to transmit and receive all the symbols of a given codeword, plus the throughput delay of the decoder itself.

The highly reliable decoded symbol present at each decoder output 155 (a-g) and the corresponding corrected signal sample generated by each adder 152 (a-g) are compared in a corresponding one of a plurality of tap update processors 156a-g. Depending upon the results of the comparison, each of the tap update processors 156a-g revises the coefficients, i.e., the contents of the tap registers 144a-g and 146a-g. For this purpose, the tap update processors 156a-g each implement an algorithm, such as a least squares algorithm, to compute the latest tap values. The preferred least squares algorithm to be used here is the Kalman algorithm, which is described in the above-referenced Proakis text beginning at page 413. In this way, n signal samples are equalized independently in the n equalizers. The n tap update processors require no previous knowledge of the characteristics of the channel from which the input signal is received, and they readily adapt to any changes in channel characteristics.

Preferably, the update is performed each time a new set of n signal samples is received in the feedforward registers 140 (a-g). Each tap update processor 156a-g computes or updates each of the individual multiplier coefficients stored in corresponding ones of the tap registers 144a-g and 146a-g, in accordance with the Kalman algorithm or the like. Such algorithms are so well-known in the art that only the brief summary given below need be included here. The important point is that the equalization of the input signals received in the system of FIG. 4a is performed separately in each of the time windows of FIG. 4b by separate equalizers without requiring previous knowledge of the channel characteristics and without assuming constant channel characteristics.

KALMAN ALGORITHM FOR UPDATING THE FEEDFORWARD AND FEEDBACK MULTIPLIER COEFFICIENTS

The following is a brief summary of the Kalman algorithm executed by each tap update processor 156.

In order to summarize the algorithm, the following definitions are necessary:

Each feedforward register has M symbol positions and each feedback register has R symbol positions.

The combined content of the M+R register positions of the pair of feedforward and feedback registers in a given one of the N equalizers at any particular time $\tau$ is defined as an M+R=N dimensional vector $Y_N(t)$.

The M+R multiplier ("tap") coefficients stored in the corresponding pair of feedforward and feedback tap registers of one of the N equalizers at time t is defined as an M+R dimensional vector $C_N(t)$.

The transpose of the vector $Y_N(t)$ is denoted as $Y'_N(t)$.

The $i^{th}$ component of the vector $Y_N(t)$ is denoted as $Y_i(t)$.

An inverse signal auto-correlation matrix is denoted as $P_N(t)$ and has M+R columns and M+R rows.

This matrix is defined in accordance with a time weighting factor w which is greater than 0 but no greater than 1, as follows:

$$P_N(t) = \left( \sum_{t'=0}^{t} w^{t-t'} Y_N(t') Y_N'(t') \right)^{-1}.$$

The corrected symbol generated by the error corrector at the corresponding one of its n outputs in response to the equalized version of the signal sample received at time t is denoted as I (t).

From the foregoing definitions, the Kalman algorithm for one of the N equalizer may be described as follows:

(1) Compute equalized version of the signal sample received at time t:

$I(t) = Y'_N(t) C_N(t-1).$ (2) Compute error: $e_N(t) = I(t) - I(t)$.

(3) Compute Kalman gain vector:

$$K_N(t) = \frac{P_N(t-1) Y_N(t)}{w + Y'_N(t) P_N(t-1) Y_N(t)}.$$

(4) Update inverse auto-correlation matrix:

$$P_N(t) = \frac{1}{w}[P_N(t-1) - K_N(t)r_N(t)P_N(t-1)].$$

(5) Update coefficients:

$$C_N(t) = C_N(t-1) + K_N(t) e_N(t).$$

(6) Shift the contents of the feedforward and feedback registers by one position (left to right in FIG. 4a).
(7) Insert I (t) into the left-most feedback register position and insert the next received signal sample into the left-most feedforward register position.
(8) t becomes t+1.
(9) Return to (1).

The equalizer tap coefficients C (t) change each time by an amount equal to the error $e_N(t)$ multiplied by the Kalman gain vector $K_N(t)$. Since $K_N(t)$ is N-dimensional, each of the N tap coefficients is in effect controlled by a corresponding one of the N elements of $K_N(t)$.

RELIABLE CONTENT OF THE DECISION FEEDBACK REGISTERS

As described previously, the corrected symbols generated at each of the decoder outputs 156a-g are stored in corresponding ones of the decision feedback registers 142a-g. At any given time, each decision feedback register 142a-g (as well as each feedforward register 140a-g) may be viewed as receiving one of the rows of the interleaved data array of FIG. 2b. One alternative aspect of the invention involves limiting the contents of the decision feedback registers to the reliable corrected symbols, excluding uncorrected (undecoded) symbols therefrom.

FIG. 5 illustrates the contents of the seven decision feedback registers 140a-g for the example in which the codeword length is seven and at a time in which the codeword beginning at symbol 49 in the interleaved array of FIG. 2b has just been received. FIG. 5 illustrates the availability of a decoded symbol in each of the seven channel sub-streams of FIG. 4a at a particular instant in time. The symbols in shaded register positions are those for which no decoding has yet been performed.

ALTERNATIVE EMBODIMENT OF THE DECISION FEEDBACK REGISTERS

Figure 6:
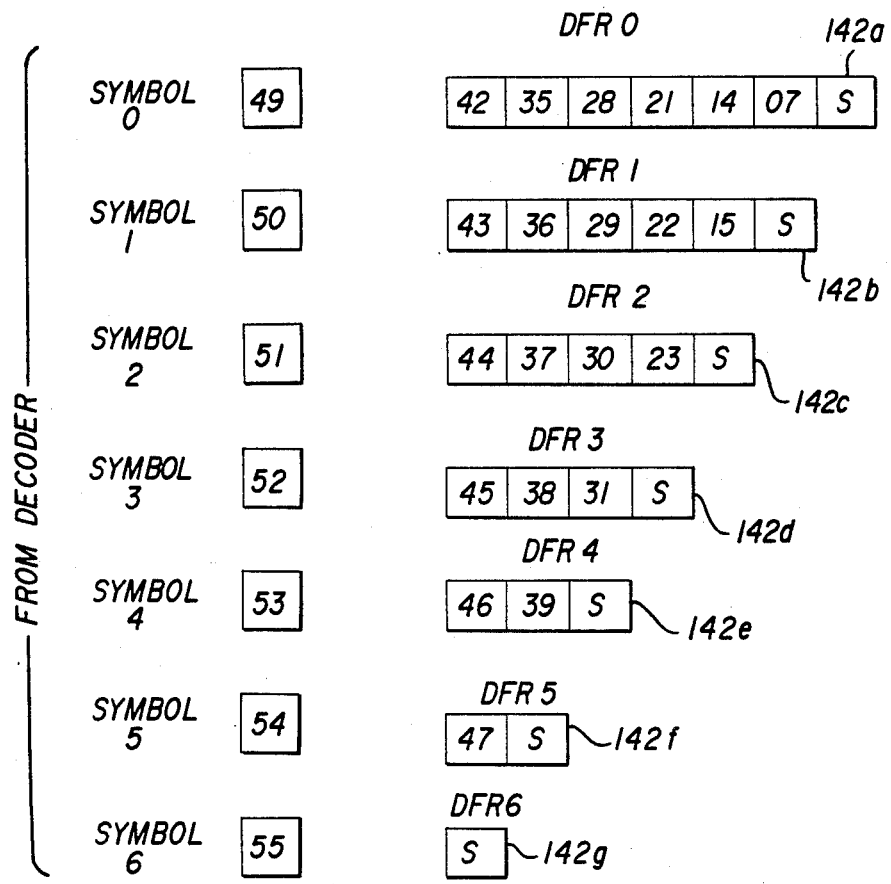
FIG. 6 illustrates an alternative embodiment of the decision feedback registers in the architecture of FIG. 4a, in which undecoded symbols are excluded.

In an alternative embodiment, only decoded symbols are provided to the decision feedback registers 142a-g. In this alternative embodiment, the decision feedback registers 142a-g, rather than being of uniform length (as in the preferred embodiment of FIG. 5) are of different lengths arranged in a stepped triangular fashion as illustrated in FIG. 6. The alternative embodiment of FIG. 6 excludes undecoded symbols from the decision feedback registers, the decision feedback registers 142a-g receiving their inputs only from the corresponding ones of the decoder outputs 156a-g.

The stepped triangular configuration of the alternative embodiment arises from the nature of the helical interleaving/de-interleaving array of FIG. 2b. The number of previously decoded symbols decreases as a linear function of the position of the symbol in the interleaved codeword, earlier symbols (codeword symbol position 01 for example) being preceded by the greatest number of decoded symbols while the higher symbols (for example codeword symbol position 07) are preceded by the least number of decoded symbols. In the seven-symbol codeword example discussed here, tap register 146a (codeword symbol position 01) has seven coefficients associated with seven multipliers (not shown) corresponding to the seven register positions of the decision feedback register 142a in FIG. 6. Likewise, tap register 146b (codeword symbol position 02) has only six coefficients associated with six multipliers, corresponding to the six positions of the second decision feedback register 142b in FIG. 6. It should be noted that this is not the preferred embodiment. In the preferred embodiment, all of the feedforward registers 140 are of the same length (M) and all of the feedback registers 142 are of the same length (R).

RECYCLING OF THE FEEDFORWARD AND FEEDBACK REGISTERS

A significant feature of the invention is that equalization (using a Kalman filter, for example) is performed on the data in each of the time windows A-G of FIG. 4b using separate equalizers for each of the windows. Thus, each time window has its own set of multiplier coefficients (stored in a corresponding one of the tap registers 144a-g and 146a-g) and its own tap update processor (156a-g). Each tap update processor controls the contents of the corresponding pair of tap registers (i.e., the multiplier coefficients) for its own time window independently of all other tap update processors and tap registers. Of course, as illustrated in FIG. 4b, there is some overlap in the data contained in each time window, so that there may be some coincidental correlation between the equalization processes performed in adjacent ones of the time windows A-G of FIG. 4b depending upon codeword length and number of codewords in each interleaved block.

In order to retain the association between each set of multiplier coefficients and each of the time windows A-G in the architecture of FIG. 4a, all of the feedforward and feedback registers 140, 142 are cycled "upwardly" periodically (once each codeword time or, equivalently, once each time seven new signal samples have been received from the channel). For this purpose, each feedforward register 140 and its tap register 144 and each decision feedback register 142 and its tap register 146 are viewed as a single unit which is, in effect, "cycled" through the architecture of FIG. 4a.

Figure 7:
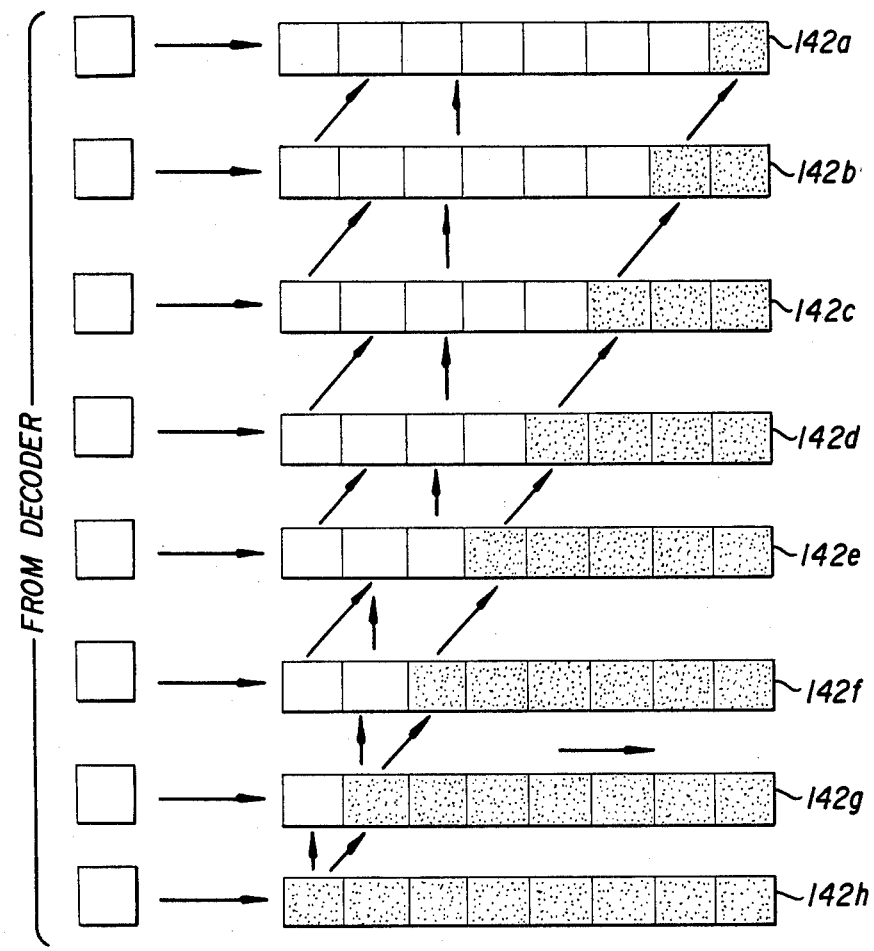
FIG. 7 illustrates the shifting and cycling operations in the array of decision feedback registers in FIG. 6.

The cycling of the decision feedback registers 142a-g is illustrated in FIG. 7. In order that the same one of the tap registers 146a-g continue to be associated with the same one of the time windows A-G of FIG. 4b, the decision feedback registers 142 and tap registers 146 pair are moved "upwardly" by one position with the reception of each new set of seven signal samples in the manner shown in FIG. 7. Specifically, each decision feedback register 142 is connected to receive the next decoded symbol from that one of the decoder outputs 156a-g which is "the next one up" from the output from which it received the previous decoded symbol. Thus, in effect, each feedback and tap register pair 142, 146 may be considered as having to be stepped "up" vertically by one row, as illustrated in FIG. 7. The contents of each decision feedback register 142 is then shifted to the right to make room for the latest codeword symbol. The ultimate effect is a shift "up" one place and shift "right" one place, as illustrated in FIG. 7. Because of the nature of the helical interleaving process of FIGS. 2b and 2c, the process of FIG. 7 ensures that the next symbol furnished to each register 142 or 146 corresponds to the next symbol in the helically interleaved data stream of FIG. 2c.

Figure 8:
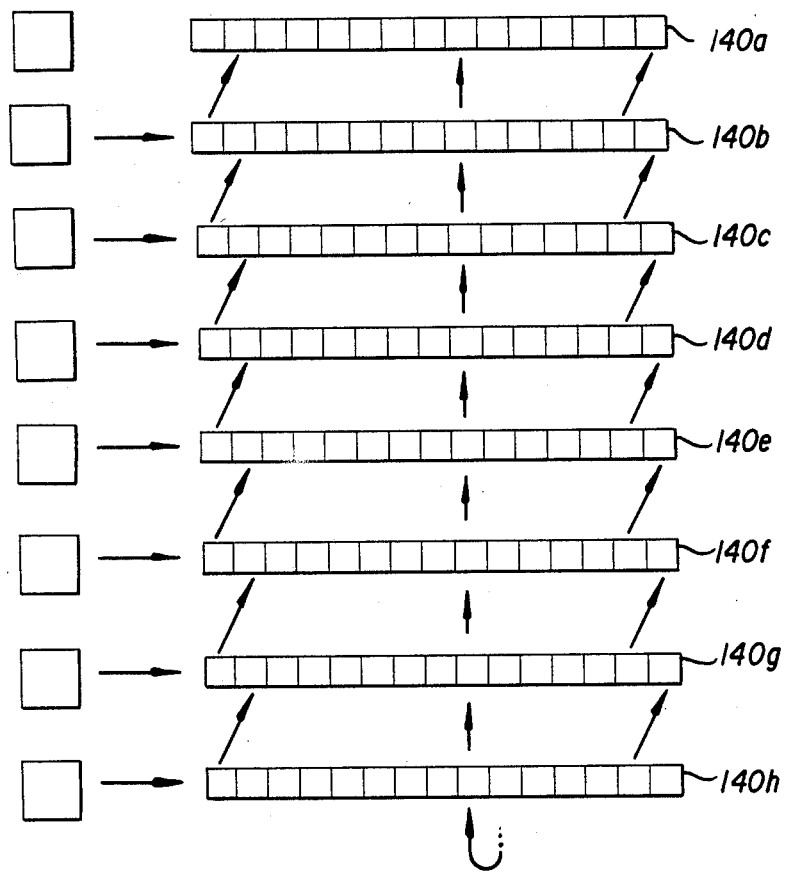

The same process is illustrated in FIG. 8 for the case of the feedforward registers 140a–g and their tap registers 144a–g. The feedforward registers 140a–g are all shifted to the right by one position to receive each next new set of seven signal samples from the corresponding output of the de-interleaver array 160 (corresponding to seven of the rows of the array illustrated in FIG. 2b). Once a new signal sample has been shifted into the left-most register position, each register pair 140, 144 is "cycled" upwardly by one position so as to be associated with the next adjacent one of the n inputs to the decoder 154. The overall result is that the feedforward and feedback registers are cycled upwardly in unison, as well as being shifted left to right, once each codeword time.

Spare Equalizer

This upwardly cycling process apparently would leave the bottom-most decoder input (154g) without an equalizer (a feedforward register/tap register, feedback register/tap register and adder combination) 140, 144, 142, 146, 148, 152 previously associated with the corresponding time window to provide an equalized input. In order to avoid such an occurrence, an extra feedforward/feedback equalizer (140h, 144h, 148h, 152h, 153h, 142h, 146h, 150h, 156h) is provided so that there is always one floating "spare" equalizer. Thus, as illustrated in FIG. 8, while the top-most equalizer "falls out", rather than going directly to the "bottom" decoder input/output, it goes to the "bottom" of the stack, and, as illustrated in FIG. 8, becomes the "extra" equalizer 140h, 144h, 148h, 152h, 153h, 142h, 146h, 150h, 156h of FIG. 4a. It remains on the bottom of the stack in FIG. 8 during the processing of the next set of seven received signal samples (i.e., during the next codeword time). Thereafter, it is moved up (connected) to the last (e.g., seventh) codeword symbol position of the decoder 154 while the top-most equalizer becomes the "extra" equalizer.

In order to prepare for this step, while the "extra" equalizer rests on the bottom of the stack, its feedforward and feedback registers 140h, 142h each receive seven new signal samples in quick succession from the helical de-interleaver array 160, so that their contents are quickly shifted to the right seven times before the beginning of the next codeword time. The shifting of the seven signal samples into the bottom registers 140h, 142h provides seven separate opportunities for the multiplier coefficient contents of the tap registers 144h, 146h to be updated by the corresponding tap update processor 156h. Thus, just before the next codeword time, when the extra equalizer is about to be shifted up, its multiplier coefficients stored in the tap registers 144h, 146h have been updated (refined) seven times so that it is ready to process the next signal sample at codeword position 7.

DATA DIRECTED MODE OF THE SPARE EQUALIZER

During the codeword time that a given one of the equalizers occupies the eighth or "spare" equalizer position below the "stack", it is not connected to the decoder 154. Thus, while the seven new signal samples are quickly shifted (left-to-right) into the spare feedforward register 140h (FIG. 8) and spare feedback register 142h (FIG. 7), the "spare" tap update processor 156h responds to the difference between the output of the "spare" detector (demodulator) 153h and the output of the "spare" adder 152h in order to update (refine) the multiplier coefficients stored in the tap registers 144g and 146g seven times (i.e., each time one of the seven new signal samples is shifted into the registers 140g, 142h).

The seven signal samples thus received correspond to seven codeword symbols, and are followed by a synchronization symbol S (which has no meaning to the decoder 154). Rather than discarding S, S is shifted into the registers 140h, 142h. The spare tap update processor 156h then enters a so-called "data-directed" mode, in which (bypassing the spare detector/demodulator 153h as indicated in dashed line) it responds to the difference between the equalized version of the signal sample corresponding to S and the known correct form of S, which is the same for all sync symbols S in the data stream. This provides the tap update processor 156h with the most reliable measure of equalizer performance with which to refine the multiplier coefficients stored in the tap registers 144h, 146h. This last update is the final step before the "spare" equalizer is cycled up to the bottom (seventh) input/output of the decoder 154 upon the beginning of the next codeword time.

A close inspection of FIG. 7 shows that the shaded (undecoded) symbols stored in the decision feedback registers 142a–h are shifted out left-to-right and replaced by decoded symbols (unshaded) as each register is cycled up. As a result, the top-most feedback register 142a (codeword symbol position 01) stores the most decoded symbols while the feedback register 142g in the last codeword position (07) stores the least. Thus, the information used by the update processor 156a in codeword position 01 is more reliable than that available to the update processor 156g in codeword position 07.

CYCLING OF THE FEEDFORWARD AND FEEDBACK REGISTERS IN THE ALTERNATIVE EMBODIMENT OF FIG. 6

In the alternative embodiment of FIG. 6, the bottom (seventh) feedback register/tap register pair 142g, 146g have only one symbol position each.

Each time a decision feedback register/tap register pair 142, 146 is shifted upwardly, the number of register positions must be increased by one. In the case of a decision feedback register 142, this is done easily because a new position is created by left-to-right the shifting of its contents. This, however, requires a new position in the associated tap register 146, namely the right-most tap register position. The multiplier coefficient which must be inserted into this new tap register position may be simply approximated by inserting a predetermined number (such as 0). During the next signal sample time, the corresponding tap update processor 156 will provide a better estimate for the new multiplier coefficient. Again, this is not the preferred embodiment.

WORKING EXAMPLE

Figure 9:
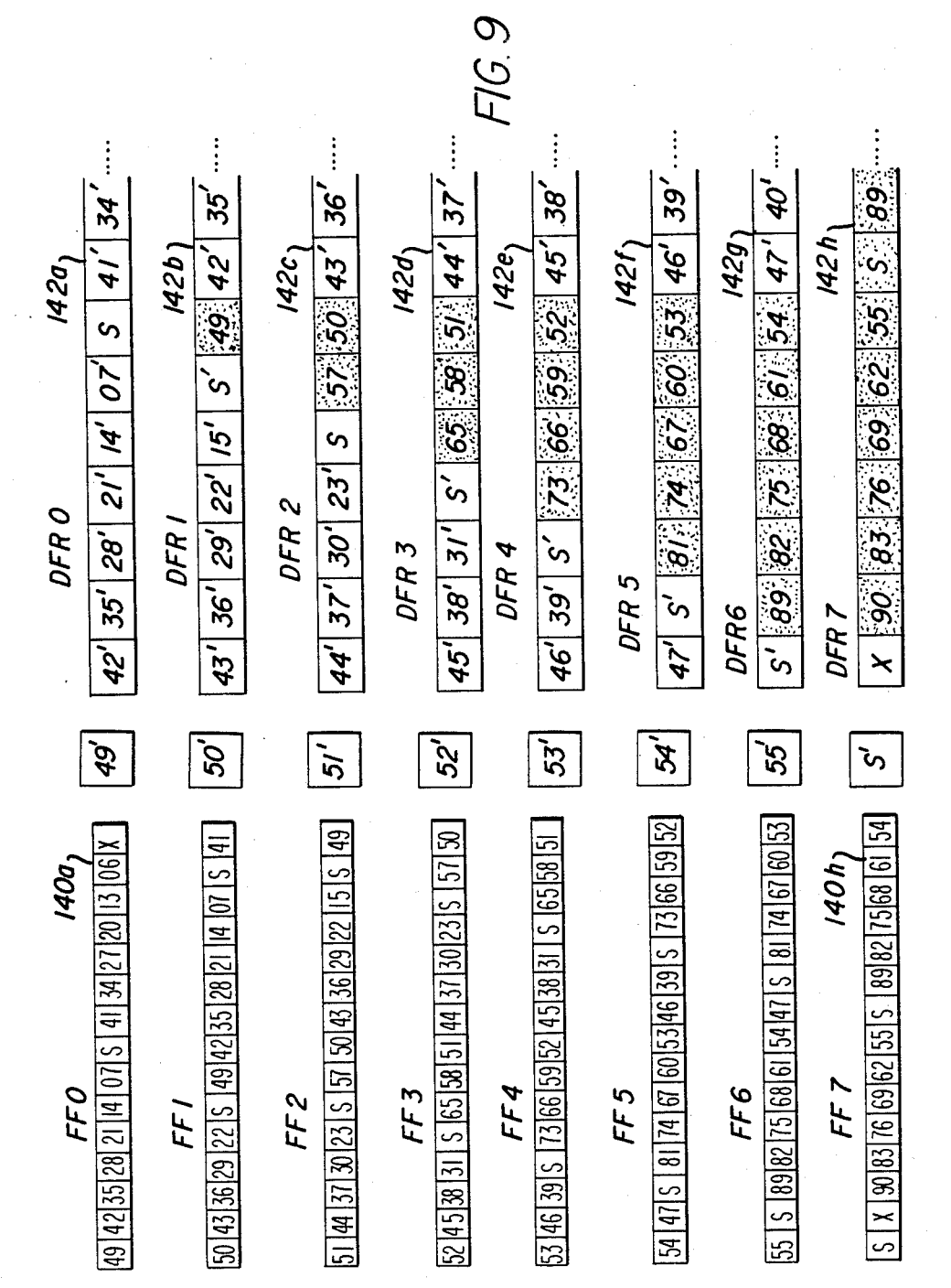
Figure 11:
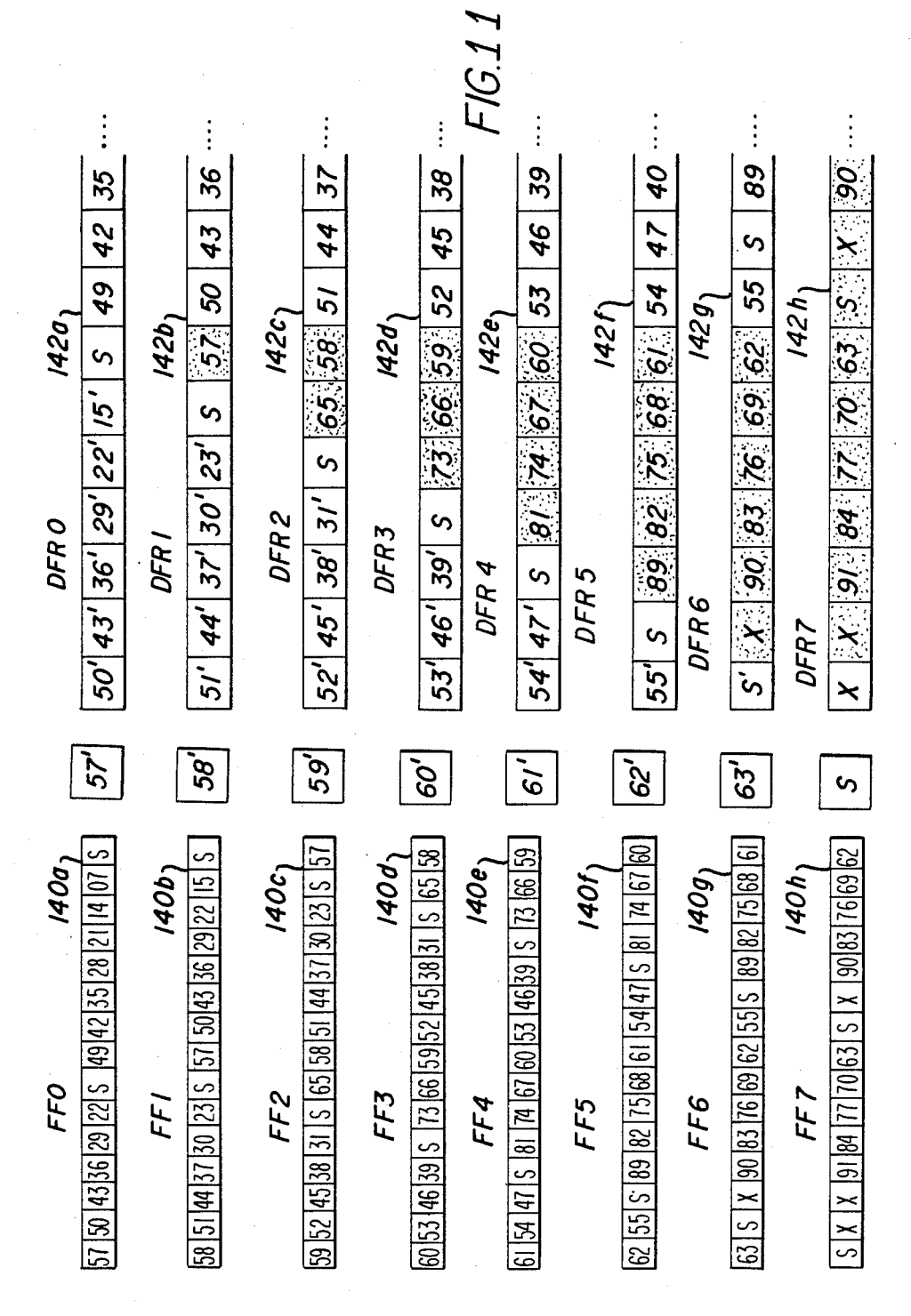

Operation of the preferred embodiment is illustrated as a working example in FIGS. 9, 10 and 11. FIG. 9 illustrates the contents of the feedforward and decision feedback registers 140, 142 of FIG. 4a at an instant in time when the signal samples corresponding to codeword "C" in the array of FIG. 2b have just been transferred into the initial (left-most) positions in the feedforward registers 140. Each feedforward register 140a–g contains the feedforward portion of the data in one of the time windows A–G of FIG. 4b. The content of each decision feedback register 142a–g comprises the feedback portion of the data in one of the time windows, including those signal samples which have been decoded by the decoder prior to the present instant in time. The contents of the feedforward registers 140 and the decision feedback registers 142 are multiplied by corresponding ones of the multiplier coefficients contained in the tap registers 144, 146 and the products combined to provide (in this example) a corrected (equalized) version of each of the received signal samples corresponding to the symbols of codeword "C" of FIG. 2b.

These equalized versions are immediately provided to the error correcting decoder 154 from each of the adders 152 through the detectors 153. The decoder 154 responds by producing a corresponding set of decoded (corrected) symbols of the codeword "C". The fact that the symbols have been decoded at this point are indicated by prime symbols in FIG. 9.

Each of the tap update processors 156 compares the corresponding received sample in the left-most position of its feedforward register 140 with the corresponding decoded symbol present at the corresponding decoder output 156. The tap update processor 156 processes this comparison to generate a revised ("updated") version of the contents of the corresponding tap register pair 144, 146. FIG. 9 shows that this process occurs in each of the seven feedforward registers 140 and the seven decision feedback registers 142.

The extra (eighth) feedforward register 140h and feedback register 142h on the bottom of the stack in the meantime receive the next serial succession of eight signal samples (including the sync symbol S) denoted "Z" in FIG. 2b. These eight signal samples (corresponding to the next time window of FIG. 4b following codeword "C") are quickly shifted in from left to right into the bottom register 140h (not illustrated in FIG. 9 but illustrated in FIG. 4a) before the next signal sample is received. The shifting sequence in the spare feedforward register 140h is the same as in the spare feedback register 142h and is illustrated in FIG. 10 (a–i). Each of the spare registers 140h, 142h must be shifted at a rate which is about eight times faster than that at which all of the other registers in the array of FIG. 4a are operated. During each of the eight left-to-right shifts illustrated in FIG. 10 (a–i), the spare tap update processor 156h updates (refines) the coefficients stored in the tap register 144h, in accordance with the Kalman algorithm (or its equivalent).

The last of the eight symbols which the spare equalizer receives is the sync symbol S. The bottom tap update processor 156h bypasses the detector 153h to obtain the received undemodulated signal sample of S and compares it with the known form of the sync symbol S and updates the corresponding tap coefficient (stored in the tap register 146h) accordingly.

At this point, the next codeword (codeword D of FIG. 2b) is available for loading into the feedforward registers 140. However, before this occurs, all of the feedforward registers 140 and the decision feedback registers 142 are shifted from left to right by one position and then cycled upwardly by one position. Then the n received signal samples corresponding to codeword "D" of FIG. 2b are shifted into the n feedforward registers 140 while the n decoded symbols of codeword "C" are shifted from the decoder 154 into the n feedback registers 142. Now, the feedforward register 140h of FIG. 9 becomes the feedforward register 140g of FIG. 11 in this process. Moreover, feedforward register 140a of FIG. 9 becomes the spare feedforward register 140h of FIG. 11, as they are all cycled upwardly by one position. Similarly, decision feedback register 142h of FIG. 9 becomes decision feedback register 142g of FIG. 11 while the feedback register 142a of FIG. 9 becomes the spare feedback register 142h of FIG. 11.

Thereafter, all of the feedforward registers 140 and decision feedback registers 142 have their contents multiplied by corresponding coefficients stored in the tap registers 144, 146, respectively to generate seven predictively corrected (equalized) signal samples which are then demodulated in the detectors 153 and furnished to the decoder 154. The decoder decodes this set of symbols as a single codeword and the results are compared in each of the tap update processors 156 so as to update the multiplier coefficients stored in the tap registers 144, 146.

Switching Network for Recycling the Equalizers

In the foregoing operation, all of the registers are recirculated through the array of FIG. 4a (once every eight received samples in the present example). Preferably, however, none of the registers is actually moved in a physical sense but is simply switched to different positions using a switching network operating in a manner analogous to that of a cooperative set of crossbar switches. For example, the transmission of each column of seven received signal samples from the de-interleaver array 160 to each of the feedforward registers 140 is controlled by an input switching network 162. The equalized output generated from the contents of each of the feedforward registers 140 is routed through a decoder input switching network 164 to the decoder 154. The output from the decoder 154 to each of the decision feedback registers 142 is controlled by decoder output switching network 166. The switching networks 164, 166 also control the feedback connections to the tap update processors 156 from the detectors 153 and from the decoder outputs 154a–g in a similar manner so that each tap update processor continues to receive the appropriate set of feedback signals.

In this embodiment, the first decoder output 156a always generates the first symbol in any codeword while the last decoder output 156g always generates the last symbol in the same codeword, and this remains constant throughout all cycles of operation. The only changes that are made are the routing of the signals to different ones of the feedforward and feedback registers 140, 142 by the action of the networks 162, 164, 166.

The advantage of the cycling and shifting process illustrated in FIGS. 7–11 is that individual ones of the time windows A–G illustrated in FIG. 4b are equalized separately and independently by independent tap processors 156 controlling individual sets of feedforward and feedback multiplier coefficients. Thus, the architecture of FIG. 4a in effect divides a single stream of helically interleaved codewords into plural sub-streams or "parallel" channels of data which are equalized separately, the number of such "parallel" channels being equal to the number of symbols in each codeword.

SOFT DECISION DECODING

In one embodiment of the invention, the error correcting decoder 154 is a soft decision decoder such as that described in U.S. patent application Ser. No.

113,579 filed Oct. 26, 1987 by Elwyn R. Berlekamp entitled "Soft Decision Reed-Solomon Decoder". In this embodiment, each of the detectors 153 furnishes a demodulated symbol produced from an equalized version of a signal sample taken from a respective one of the adders 152. If the codeword is of length seven, then there are seven detectors 153 which simultaneously furnish the decoder 154 with seven demodulated symbols. If the decoder 154 is a soft decision decoder such as that described in the above-referenced Berlekamp application, then the decoder 154 begins its decoding task with the most reliable ones of the demodulated symbols furnished by the various detectors 153.

In one embodiment, reliability of each of the demodulated symbols is established by the corresponding ones of the detectors 126 based on the resemblance of each demodulated value to an allowed symbol. For example, in QPSK modulation/demodulation, the allowed symbols may be +1 and −1, and a symbol demodulated from a given signal sample may be +1.3. From this, the detector infers that the nearest correct symbol is +1.0 and its reliability is (for example) 1−(demodulated value − nearest correct value)=1−(1.3−1.0). this example, the detector transmits to the soft decision decoder the symbol +1.0 and a corresponding reliability value of 0.7.

In yet another embodiment, each detector 153 furnishes a symbol to the soft-decision decoder 154, but does not compute its reliability. Instead, the soft-decision decoder 154 simply associates a constant reliability value with each codeword symbol position, based upon the number of reliable (decoded) symbols stored in the corresponding decision feedback register 142. It will be recalled that the feedback register 142a (codeword position 01) stores the most reliable symbols. Therefore, codeword symbol position 01 is assigned the highest reliability (e.g., 0.9) and position 07 the lowest (e.g., 0.3). Further description is not necessary here, the principles of the soft decision Reed-Solomon decoder being more thoroughly discussed in the above-referenced application by Berlekamp.

While the invention has been described in detail with reference to preferred embodiments thereof, it is understood that variations and modifications thereof may be made without departing from the spirit and scope of the invention.

What is claimed is:

1. A processor which views through n time windows a serial stream of received symbols in an array of helically interleaved codewords of codeword length n symbols, wherein n is an integer, whereby each of said windows contains a given one of the n received symbols of ones of said codewords, said processor comprising:

error correction means for receiving a version of the n received symbols of each one of said codewords and providing therefrom n corrected symbols forming a corrected codeword corresponding thereto;

means associated with each of said n time windows for individually multiplying the symbols included in individual ones of said time windows with individual ones of said n sets of respective feedforward coefficients, and combining the resulting products to form n feedforward sums;

means associated with each of said n time windows for multiplying the currently available corrected symbol corresponding to any one of the symbols included in a respective time window by respective sets of feedback coefficients and combining the resulting products to form a plurality of n feedback sums; and means for combining said n feedforward sums and n feedback sums respectively to produce said versions of said n received symbols, and transmitting them to said error correction means, whereby said stream of received symbols moves through said n windows, while the n portions of said stream included within said n windows are separately equalized.

2. The processor of claim 1 further including n update processor means associated with individual ones of said n windows, said update processor means for comparing each corrected symbol with the corresponding version of said received symbol comprising the combination of said feedforward and feedback sums, and computing therefrom a new version of each of said feedforward and feedback coefficients associated with the respective time window.

3. The processor of claim 2 wherein each of said feedforward and feedback coefficients are initialized to a preselected estimate, whereby said update processor means continually refines each estimate of each coefficient each time a new received symbol is received in one of said time windows, whereby no prior assumption of channel characteristics is required and whereby no assumption of constant channel characteristics is required.

4. The processor claim 2 wherein said update processor executes a Kalman algorithm, whereby said feedforward and feedback coefficients are computed so as to minimize the error between said version of said received symbol and the corresponding one of said corrected symbols.

5. A parallel channel equalizer system which processes a stream of data comprising a plurality of codewords of length n symbols, wherein n is an integer, helically interleaved with one another, said parallel channel equalizer system comprising:

a de-interleaver array which receives said stream of data and helically de-interleaves it into columns and rows, whereby codewords correspond to columns in said array and portions of said stream correspond to rows;

error correction means for receiving an equalized version of each of said codewords and providing therefrom a corrected codeword;

a plurality of n feedforward registers adapted to receive n sub-streams of data corresponding to n of the rows of said de-interleaver array, said feedforward registers each storing m symbols, wherein m is an integer, and each further including means for combining said m symbols with m coefficients whereby to produce n feedforward sums of products therefrom;

a plurality of n feedback registers adapted to receive corresponding symbols of each one of said corrected codeword from said error correction means, said feedback registers further including means for combining each symbol contained therein with individual coefficients of corresponding n sets of coefficients and producing n feedback sums of products therefrom;

means for combining corresponding ones of said n feedforward sums of products and n feedback sums of products whereby to produce a set of n equalized codeword symbols associated with n corresponding codeword positions, and for transmitting said equalized symbols to said error correction means wherefrom said error correction means may produce said corrected codeword symbols therefrom.

6. The parallel channel equalizer of claim 5 further comprising recirculating means for recirculating said n sets of feedforward registers and said n sets of feedback registers so that the equalized symbol generated by a given feedforward and feedback register pair comprises a symbol in a codeword position adjacent the codeword position of the symbol last produced therefrom.

7. The parallel channel equalizer of claim 6 further comprising means for comparing each equalized symbol with the corresponding corrected symbol so as to compute an error, and for generating revisions to the corresponding set of feedforward and feedback coefficients in such a manner as to tend to reduce said error.

8. The parallel channel equalizer of claim 5 wherein said error correction means comprises a soft decision decoder which processes the symbols of a received codeword in an order determined by the number of available decoded symbols in the corresponding one of said feedback registers.

9. The parallel channel equalizer of claim 7 further comprising an additional $(n+1^{st})$ feedforward register and feedback register, including means for multiplying the contents thereof by an $n+1^{st}$ set of feedforward and feedback coefficients, wherein said additional feedforward register replaces a shifted one of said n feedforward register each time a new received codeword is loaded into said n feedforward registers, and wherein said additional feedforward registers are initialized successively with a row of symbols from said de-interleaver array from which said comparing means generates a preliminary estimate of said $n+1^{st}$ set of feedforward coefficients.

10. A parallel channel equalizer process, comprising:

viewing a stream of data constructed by helically interleaving a plurality of codewords of length n symbols, wherein n is an integer, through a plurality of n time windows through which said data stream passes, whereby the n symbols of a given codeword are present in respective ones of said n time windows;

transmitting an equalized version of said n symbols to an error correction decoder and obtaining therefrom n corrected symbols;

combining the n sets of data contained within said n time windows with n sets of feedforward coefficients individually to produce n feedforward sums of products;

combining the n sets of the currently available corrected symbols corresponding to the symbols currently viewed through said n windows with n respective sets of feedback coefficients and forming therefrom n feedback sums of products;

combining said feedforward sums of products and feedback sums of products respectively so as to produce n ones of said equalized symbols comprising an equalized version of a codeword and providing said equalized version of a codeword to said error correction means wherefrom said error correction means may compute n corrected symbols comprising a correct codeword.

11. The parallel channel equalization process of claim 10 further comprising comparing said equalized symbols with said corrected symbols for each of said n windows and executing an algorithm therewith so as to provide a revised estimate for the corresponding sets of said feedforward and feedback coefficients associated with the respective ones of said windows.

12. The parallel channel equalization process of claim 11 wherein said algorithm comprises the Kalman algorithm.

* * * * *